United States Patent [19]
Pelzer

[11] Patent Number: 5,922,626
[45] Date of Patent: Jul. 13, 1999

[54] SELF-ADHERING REINFORCING MATERIAL FOR NONWOVEN TEXTILE FABRICS

[75] Inventor: Helmut Pelzer, Herdecke, Germany

[73] Assignee: HP-Chemie Research and Development Ltd., Waterford, Ireland

[21] Appl. No.: 08/874,039

[22] Filed: Jun. 12, 1997

Related U.S. Application Data

[63] Continuation-in-part of application No. PCT/EP95/04930, Dec. 13, 1995.

[30] Foreign Application Priority Data

Dec. 14, 1994 [DE] Germany .................. 44 44 505

[51] Int. Cl.⁶ ........................................... B32B 27/28
[52] U.S. Cl. ..................... 442/394; 428/515; 428/516; 442/398
[58] Field of Search .................... 442/394, 398; 428/515, 516

[56] References Cited

U.S. PATENT DOCUMENTS 4,766,029  8/1988  Brock et al. ................. 428/286

FOREIGN PATENT DOCUMENTS

| 0310200 | 9/1988 | European Pat. Off. . |
|---|---|---|
| 0340982 | 4/1989 | European Pat. Off. . |
| 0469309 | 2/1992 | European Pat. Off. . |
| 0584445 | 3/1993 | European Pat. Off. . |
| 2180543 | 4/1987 | United Kingdom . |
| 9323596 | 11/1993 | WIPO . |

*Primary Examiner*—James J. Bell
*Attorney, Agent, or Firm*—Baker & Botts, L.L.P.

[57] ABSTRACT

The self-adhering tape-like or fibrous reinforcing material to be used according to the invention consists of laminates of at least two or more co-extruded layers of at least one high-temperature stable plastic material (A) and at least one low-melting plastic material (B). The low-melting plastic material (B) has self-adhering binder properties whereas the high-temperature stable plastic material (A) is suitable for conferring increased strength properties to nonwoven textile fabrics, in particular in the automobile area.

17 Claims, No Drawings

SELF-ADHERING REINFORCING MATERIAL FOR NONWOVEN TEXTILE FABRICS

This application is a continuation-in-part of PCT/EP95/04930, filed Dec. 13, 1995, designating the U.S., which is incorporated herein by reference in its entirety.

The invention relates to a self-adhering tape-like or fibrous reinforcing material having a binder property for nonwoven textile fabrics, a process for the production thereof, the use of the reinforcing material for the manufacturing of nonwoven textile fabrics, the nonwoven textile fabrics manufactured this way, as well as the use of these nonwoven textile fabrics in the automobile sector.

In the automobile sector nonwoven textile fabrics are a frequently used material of construction having a broad range of properties. For example, phenolic resin bonded nonwoven textile fabric has been used for a long time, among other things, because of the good damping characteristics thereof as a material for supporting and covered parts (pure or as composite) in automobile industry for passenger car and truck manufacturing. In form of low-cost flat fabric this product served initially and exclusively for upholstering purposes. However, this material has presented itself in a number of variants recently and may be used versatilely. Moulded articles are especially preferred.

Phenolic resin bonded nonwoven textile fabric is available on the market in bulk densities of from 50 to 1000 $kg/cm^3$ with thicknesses of from 5 to 30 mm. Is has to be described as so-called porous composite comprising three phases (cotton, cured phenolic resin, and air)—a material of construction, the profile of properties of which can be modified within wide limits. Cotton is fibrous, phenolic resin is present punctatedly and net-flat as a kind of matrix.

By selecting the nonwoven fabric the acoustics and the strength of the composite can be controlled particularly. Especially preferred materials for the manufacturing of the nonwoven fabric are glass-fibre reinforced or glass-gauze reinforced fibrous materials, especially nonwoven textile fabrics containing binders, preferably such consisting of a blended cotton fabric. These nonwoven fabrics are brought to the desired strength by pressing at elevated temperature.

The special features and the performance of this last-mentioned product group explain itself by the chemical and morphological structure of cotton as well as by the duroplast character of the cured phenolic resins usually being employed as binder of the nonwoven blended cotton fabric. Deformability, pressability of the cotton, statistical occurance of bonding points, and the laminating and/or surface action of the binder molecules adhering lengthwise to the fibres and also condensated out in this manner are additional quantities of influence.

The cotton withstands the manufacturing process practically without modification of its physical-chemical properties. It imparts to the product special features of quality such as sound-absorptive capacity, good mechanical strength values, impact strength, and shatter-resistance in the cold.

Especially preferred binders for the nonwoven fabrics are selected from phenol-formaldehyde resins, epoxy resins, polyester resins, polyamide resins, polypropylene, polyethylene and/or ethylvinylacetate copolymers. After curing, phenolic resins have the typical duroplastic properties being transferred to the final product. Usually, the nonwoven textile fabric is manufactured from the reclaimed cotton and powdery phenolic resin via the dry path. Curing takes place either within the heating channel or via the uncured half-finished good as intermediate within the press. For the parts which are to be used within the passengers compartment a select textile is employed.

In WO 93/23596 A1 are described nonwoven mouldable composites, whereby 40–80 % by weight of a first thermoplastic fibre and a second thermoplastic fibre having a lower melting point are consolidated into a nonwoven structure and intermixed thoroughly with the fibres. Subsequently, the nonwoven structure is heated to a temperature above the melting point of the second fibre but below that of the first fibre to liquefy the second fibre to form a thermoplastic resin. Subsequently, the nonwoven textile fibre structure is compressed to flow the binder resin into voids, thereby displacing air and encapsulating the first fibre. Following cooling, the structure has reduced air voids and does not shrink on thermoforming. For this it is necessary to feed two different types of fibres into the nonwoven textile fabric resulting in practice frequently in achieving an inhomogeneous distribution of fibres.

To feed reinforcing agents and binders it has been proposed in the art to use also powdery thermoplastic binders in addition to the reinforcing material, especially fibres. However, this feeding of powdery binder has extremely important drawbacks for the manufacturing of nonwoven textile fabrics, as in this case compression is frequently performed using air pressure resulting in blowing out at least a portion of the binder resin off the mould.

To bind the binder resin to the reinforcing fibres so-called composite fibres have been proposed in the art, in which the core of the fibre and the outer coat have different melting points. Thus, for example it is possible to manufacture composite fibres having a high-temperature stable core being surrounded by a low-melting, especially thermoplastic binder resin. When adding these fibres to the nonwoven textile fabric, the nonwoven textile fabric is compressed at a temperature being above the melting point of the low-melting fibre material but below the melting point of the reinforcement fibre core, a extremely strong compound with the nonwoven textile fabrics can be achieved. However, manufacturing of such composite fibres is extremely complex.

Consequently, the object of the present invention is to provide an inexpensive self-adhering tape-like or fibrous reinforcing material having a binder property for nonwoven textile fabrics. An appropriate reinforcing material should be suitable for the use within nonwoven textile fabrics, especially in nonwoven textile fabrics being employed in the automobile sector in manifold forms.

Therefore, a first embodiment of the present invention consists in a self-adhering tape-like or fibrous reinforcing material having binder properties for nonwoven textile fabrics consisting of laminates of at least two or more co-extruded layers of at least one high-temperature stable plastic material (A) and at least one low-melting plastic material (B).

Therefore, the self-adhering reinforcing material according to the invention is characterized by a composite structure having at least two layers of at least two chemically and physically different plastic materials (A) and (B). The essential difference between plastic material (A) and plastic material (B) consists in the temperature properties. Whereas plastic material (A) is selected from high-temperature stable materials, therefore imparting a reinforcing effect on the nonwoven textile fabric, the low-melting plastic material (B), due to its binder properties, is suitable to generate a good compounding between the textile fibres, the reinforcing fibres and itself from the high-temperature stable plastic material (A).

In a preferred embodiment of the present invention, the high-temperature stable plastic material (A) is selected from polyethylene terephthalate, polybutylene terephthalat, polyamides, and highly cross-linked polyolefins such as polyethylene and/or polypropylene. The melting range preferably should be within the temperature range above 100° C., especially above 150° C. Temperatures in the range above 300° C. are especially preferred.

The low-melting plastic materials (B) preferably have thermoplastic properties. As is generally known, thermoplastics can be processed to moulded articles in the softened state by pressing, extruding, injection moulding, or other moulding processes. In accordance with the present invention the choice of thermoplastic plastic materials is especially defined by the subsequent purpose of application. In this connection, it has essentially to be adjusted to the subsequent temperature load of the nonwoven textile fabric. Especially preferred thermoplastic plastic materials (B) are selected from low-melting high-pressure process polyethylene, low-pressure polyethylene, polypropylene, polystyrene, polyethylene methacrylates, ethylene-vinyl acetate, styrene-acrylonitrile, the copolymers thereof and copolymeric polyamides and polyesters. Especially preferred in this are the bulk plastics due to the low costs. The melting range should preferably range from 70 to 100° C., especially from 70 to 80° C.

Contrary to the composite fibres according to the art, in which the microscopic and macroscopic properties of the core and the outer shell differ, in the reinforcing materials according to the present invention different temperature properties are present in the layers.

The inventive reinforcing materials are to be used in nonwoven textile fabrics known as such. Therefore it is necessary to match the melting behavior as well as the forming behavior of the plastic materials (A) and (B) with these materials.

The temperature properties of the different materials of the inventive reinforcing materials can be defined especially well by the melting ranges of the plastic materials. Within the meaning of the present invention it is especially preferred the melting range of the high-temperature solid plastic material (A) is at least 50° C., especially 100° C. above the melting range of the low-melting plastic materials (B).

To achieve a distinct reinforcing character it is especially preferred within the meaning of the present invention to adjust the diameter and the length of the self-adhering reinforcing materials especially. Especially preferred widths and heights within the meaning of the present invention are from 20 to 500 $\mu$m, especially from 50 to 100 $\mu$m. Within said range especially good reinforcing properties are achieved. The same way, it is preferred to adjust the length of the self-adhering reinforcing materials to a range of from 2 to 50 mm, especially of from 5 to 20 mm.

The basic concept of the present invention is based on a structure having at least two layers of two co-extruded plastic materials (A) and (B) being bonded to each other without additional adhesives. However, in the same manner it is preferred according to the present invention to increase the number of layers. Therefore, without any difficulty layer structures of three, four, five, or six layers of the respective materials (A) and (B) are possible. Especially preferred within the meaning of the present invention is, however, an altogether three-layer layer structure, in which the plastic materials (A) and (B) alternate as follows:

One layer of the high-temperature solid plastic material (A) is covered by respective layers of the low-melting plastic material (B) on the top side and the bottom side of the high-temperature solid plastic material (A). In the same way, however, an inverse layer structure is possible, in which one layer of the low-melting plastic material (B) is covered by two layers of the high-temperature solid plastic material (A). In this case, the reinforcing material upon using has to be brought to a temperature allowing a leaking of the low-melting plastic material (B) out of the sandwich arrangement.

A further embodiment of the present invention consists in the process for the production of the reinforcing materials defined at the beginning. These can be obtained especially by co-extruding at least two layers of a high-temperature solid plastic material (A) and one low-melting plastic material (B) at a temperature within or above the glass transition ranges of the plastic materials (A) and (B) and the subsequent cutting or disintegrating to the desired dimensions by cutting, pressing, or striking tools.

The co-extrusion of the different plastic materials (A) and (B) is of special importance in the inventive process. Whereas the extrusion of low-melting plastic materials (B) usually proceeds without problems, extrusion of high-temperature solid plastic materials (A) in practice is often connected with problems, as the materials often crosslink or even decompose at high temperatures. Therefore, it is necessary to adjust the extrusion conditions to the required conditions, especially to the high-temperature solid plastic materials (A).

After the manufacturing of a flatlike laminate from the plastic materials (A) and (B) by co-extrusion, subsequently during an additional operating step a self-adhering tape-like or fibrous reinforcing material is produced. The dimensions defined above can be obtained by cutting, pressing, or striking.

Therefore, an additional embodiment of the present invention consists in the use of the self-adhering tape-like or fibrous reinforcing material as defined at the beginning for the manufacturing of nonwoven textile fabrics, especially glass fibre reinforced or glass gauze reinforced fibre materials and nonwoven cotton fabrics. Here, a partial or complete replacement of the normally employed phenolic resin binders can be achieved.

The nonwoven textile fabrics according to the invention due to the special features such as high stiffness of compressed nonwoven fabrics are superior to plastic sheets of known plastic materials as well as glass fibre reinforced polypropylene or similar materials having a similar weight. Moreover, the acoustic properties arising from the porosity and the layer structure of the material impart the materials a special suitability for the automobile section.

Nonwoven textile fabrics within the meaning of the present invention comprise preferably natural fibres, especially cotton, flax, jute, linen, but as well synthetic fibres such as polybutylene terephthalates, polyethylene terephthalates, nylon 6, nylon 66, nylon 12, viscose, or rayon as textile fibre, optionally in addition with usual binder.

The type and the amount of self-adhering tape-like or fibrous reinforcing materials to be used is essentially determined by the purpose of application of the nonwoven textile fabrics. Thus, in general the use of from 5 to 50% by weight, especially of from 20 to 40% by weight of the self-adhering tape-like or fibrous reinforcing material is employed, based on the nonwoven textile fabric. In case additional usual binders are to be used within the nonwoven textile fabrics it is possible, however, to reduce the amount of the self-adhering tape-like or fibrous reinforcing material accordingly.

Another embodiment of the present invention relates to a process for the preparation of the above defined nonwoven textile fibre fabrics. The textile fibre materials are appropriately combined with the self-adhering tape-like and fibrous reinforcing materials and are obtained by pressing at a temperature above the melting range of the low-melting plastic material (B) but below the decomposition range of the high-temperature stable plastic material (A). According to the present invention, a temperature range of from 120 to 250° C., in particular from 180 to 250° C., is particularly preferred since nonwoven textile fibres used so far in the prior art are also pressed at such a temperature. In this temperature range, certain materials will cross-link such that a particularly strong compound will form.

The composite materials according to the invention can be used as such in the automobile section. According to the present invention, it is also preferred, however, to provide them with decorative layers, for instance, carpet floor coverings.

Another embodiment of the present invention consists in the special use of the above defined composite materials in the automobile area. It is particularly preferred to use the composite materials according to the invention for acoustic absorption in the areas of the engine hood, scuttle (on both sides), tunnel, door, roof, legroom, and ventilation duct, as well as an optionally self-supporting base for interior linings, in particular for instruments coverings, tunnel linings, door linings, seatback linings, and spare wheel coverings, as well as for parts with double functions, especially as roof lining, hat rack, filing piece, luggage trunk matting, and wheel box lining.

The self-adhering reinforcing material of this invention comprises a bi-layer or multi-layer made up of at least one thermoplastic material and at least one thermosetting material laminated together. These materials are typically formed as a bi- or multi-layer sheet and subsequently cut into ribbons or reduced to fibers by physical force, e.g., by cleavage or comminution.

In one embodiment of this invention, a self-adhering reinforcing material which is adapted for use as a binder for non-woven textile fabrics is provided. The reinforcing material is a laminate which has at least one layer of a high-temperature stable plastic material and at least one layer of a low-melting plastic material. As used herein, high-temperature stable plastic materials are materials composed of polymers that remain solid at temperatures used in forming and/or processing non-woven fabrics according to this invention, preferably the polymers do not melt at 100 C. or higher. As used herein, low-melting plastic materials are materials composed of polymers that melt or exhibit thermoplasticity at temperatures in the upper ranges of the temperatures used in forming and/or processing non-woven fabrics according to this invention, for example, from 70 C. to 100 C. In an alternative embodiment of the invention, the high-temperature stable plastic material and the low-melting plastic material are co-extruded to form a laminate. In a further embodiment of this invention, the laminate sheets can be formed into ribbons or fibers by cutting or striking. Alternatively, material of the desired size and shape may be obtained by running the laminate through presses.

In another embodiment of this invention, a method for preparing self-adhering reinforcing materials adapted for use as binders of non-woven textile fabrics is provided using at least one layer of high-temperature stable plastic material and at least one layer of low-melting plastic material and forming a laminate from the layers of high-temperature stable plastic material and low-melting plastic material. In an alternative embodiment of the invention, the layers of high-temperature stable plastic material are provided by extruding high-temperature plastic materials and the layers of low-melting plastic material are provided by extruding low-melting plastic materials. In another alternative embodiment, the laminate is formed by co-extruding the layers of high-melting stable plastic material and low-melting plastic material.

In another embodiment of this invention, a non-woven textile fabric is provided which includes the self-adhering reinforcing material adapted for use as a binder for non-woven textile fabrics which is a laminate of at least one layer of high-temperature stable plastic material and at least one layer of low-melting plastic material.

In yet another embodiment of this invention, a method for the preparation of non-woven textile fabrics is provided by pressing a textile fiber material and a self-adhering reinforcing material, which is a laminate of layers of high-temperature stable plastic material and low-melting plastic material, at a temperature above the melting range of the low-melting plastic material but below the melting range of the high-temperature stable plastic material. Preferably, the high-temperature stable plastic material is a duroplastic that will melt at high temperature when first extruded, but after curing will decompose at elevated temperature before melting. In this further embodiment, the temperature of the pressing step is lower than the decomposition temperature of the heat-temperature stable plastic material.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

I claim:

1. A self-adhering reinforcing material adapted for use as binders for non-woven textile fabrics, comprising:

a high-temperature stable plastic material; and a low-melting plastic material;

wherein said high-temperature stable plastic material and said low-melting plastic material are layers of a laminate.

2. The self-adhering reinforcing material according to claim 1, wherein said high-temperature plastic material and said low-melting plastic material are co-extruded to form a laminate.

3. The reinforcing material according to claim 1, wherein said high-temperature stable plastic material is selected from the group consisting of poly(ethylene terephthalates), poly(butylene terephthalates), polyamides, highly cross-linked polyolefins, and mixtures thereof.

4. The reinforcing material according to claim 1, wherein said low-melting plastic material is thermoplastic.

5. The material according to claim 3, wherein said low-melting plastic material is selected from the group consisting of high-pressure polyethylene, low-pressure polyethylene, polypropylene, polystyrene, poly(methyl methacrylates), ethylene-vinyl acetates, styrene-acrylonitrile, copolymers thereof, copolymeric polyamides and copolymeric polyesters.

6. The material according to claim 1, wherein the melting range of said high-temperature stable plastic material is at least 50° C. higher than the melting range of said low-melting plastic material.

7. The material according to claim 6 wherein the the melting range of said high-temperature stable plastic material is 100° C. higher than the melt transition range of said low-melting plastic material.

8. The reinforcing material according to claim 1, wherein said material has a length of 2 to 50 mm.

9. The reinforcing material according to claim 1, wherein said material is in the form of fibers having a cross-sectional dimension of 50 to 100 microns.

10. The reinforcing material according to claim 1, wherein said laminate comprises a first layer, a second layer and a third layer, and wherein said first layer and said third layer comprise said high-temperature stable plastic material and said second layer is said low-melting plastic material.

11. The reinforcing material according to claim 1, wherein said laminate comprises a first layer, a second layer and a third layer, and wherein said first layer and said third layer comprise said low-melting plastic material and said second layer comprises said high-temperature stable plastic material.

12. A non-woven textile fabric, comprising said reinforcing material according to claim 1.

13. A non-woven textile fabric according to claim 12, wherein said fabric is a glass-fibre reinforced material, a glass-gauze reinforced fibrous material, or a non-woven cotton fabric.

14. A non-woven textile fabric according to claim 12, further comprising natural fibres with binders, natural fibres without binders, synthetic fibres with binders, sythetic fibres without binders, or mixtures thereof.

15. A non-woven textile fabric according to claim 14, wherein said natural fibres are selected from the group consisting of cotton, flax, jute, linen; and said synthetic fibres are selected from the group consisting of poly (butylene terephthalates), poly(ethylene terephthalates), nylon 6, nylon 66, nylon 12, viscose, and rayon.

16. A non-woven textile fabric according to claim 12, wherein said reinforcing material is present in said fabric at 5% to 50% by weight based on said fabric.

17. A non-woven textile fabric according to claim 13, wherein said reinforcing material is present in said fabric at 20% to 40% by weight based on said fabric.

* * * * *